United States Patent
Cho et al.

(10) Patent No.: US 7,479,171 B2
(45) Date of Patent: Jan. 20, 2009

(54) DUST SEPARATOR FOR CYCLONE TYPE CLEANER

(75) Inventors: Hyoung-Joo Cho, Gyeongsangnam-Do (KR); Jung-Wan Ryu, Gyeongsangnam-Do (KR); Kyeong-Seon Jeong, Busan (KR); Sung-Hwa Lee, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 611 days.

(21) Appl. No.: 10/537,832

(22) PCT Filed: Jun. 7, 2004

(86) PCT No.: PCT/KR2004/001359

§ 371 (c)(1),
(2), (4) Date: Jun. 8, 2005

(87) PCT Pub. No.: WO2004/112938

PCT Pub. Date: Dec. 29, 2004

(65) Prior Publication Data

US 2006/0059874 A1    Mar. 23, 2006

(30) Foreign Application Priority Data

Jun. 20, 2003    (KR) ...................... 10-2003-0040367

(51) Int. Cl.
*B01D 45/12*     (2006.01)

(52) U.S. Cl. ............................. 55/338; 55/345; 15/350; 15/353

(58) Field of Classification Search .................. 55/343, 55/345, 347, 349, 437, 438; 96/15, 55; 15/350, 15/353
See application file for complete search history.

(56) References Cited

U.S. PATENT DOCUMENTS 3,049,343 A * 8/1962 Helming ...................... 34/592
6,746,500 B1 * 6/2004 Park et al. ..................... 55/343

FOREIGN PATENT DOCUMENTS

EP          0506028 A2    9/1992
GB          693418 A    7/1953

* cited by examiner

*Primary Examiner*—Robert A Hopkins
(74) *Attorney, Agent, or Firm*—Birch, Stewart, Kolasch & Birch, LLP

(57) ABSTRACT

A dust separator of a cyclone type cleaner includes a first dust separator connected to a suction pipe, for separating dust from air by a centrifugal force for the first time; a collecting container connected to a lower portion of the first dust separator and in which the dust separated in the first dust separator is collected; and a second dust separator connected to an upper portion of the first dust separator, for sucking air which has passed through the dust separation in the first dust separator and separating dust from the air by a centrifugal force for the second time, so that an efficiency of collecting dust is improved without deteriorating a suction force of air.

8 Claims, 5 Drawing Sheets

[Fig. 1]
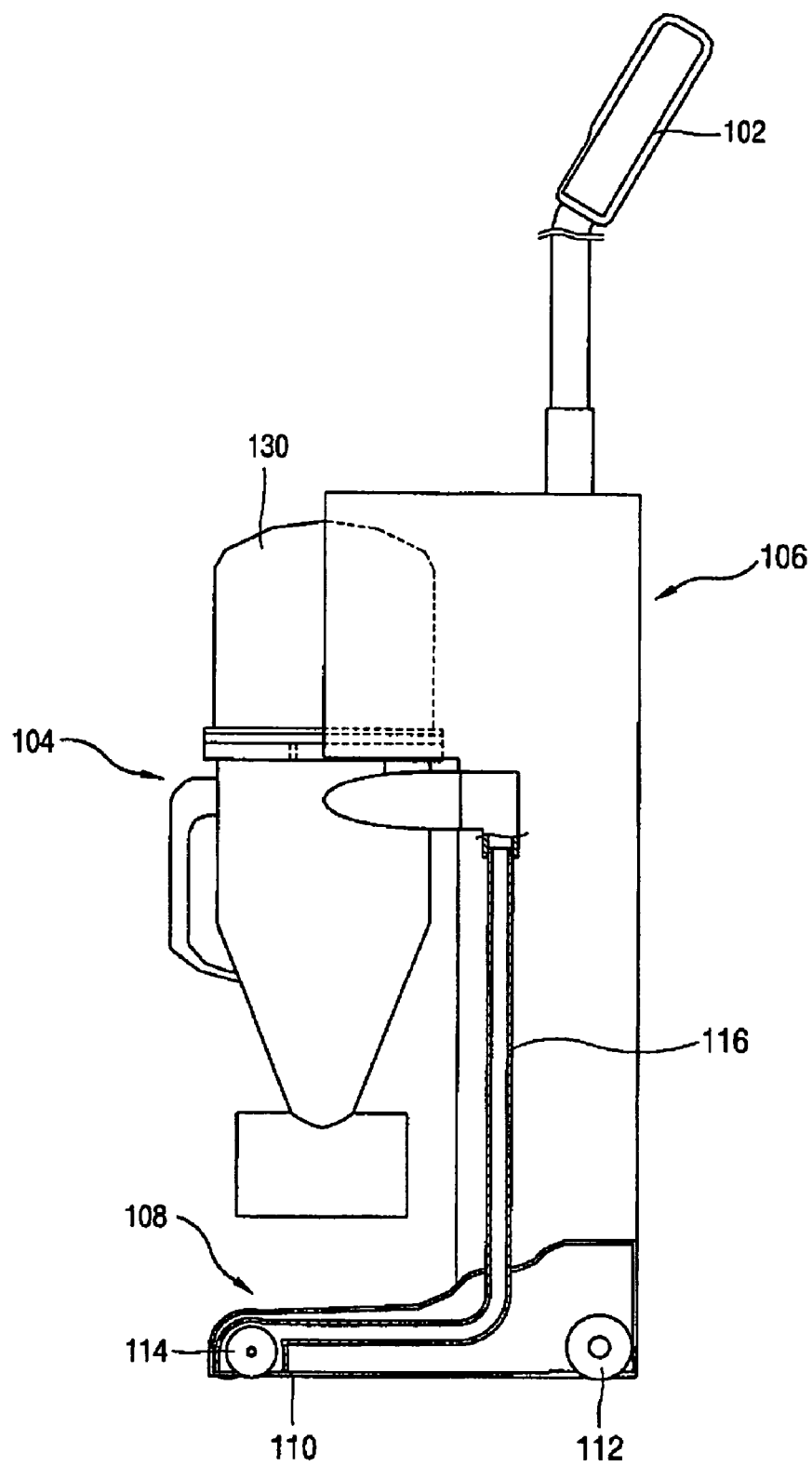

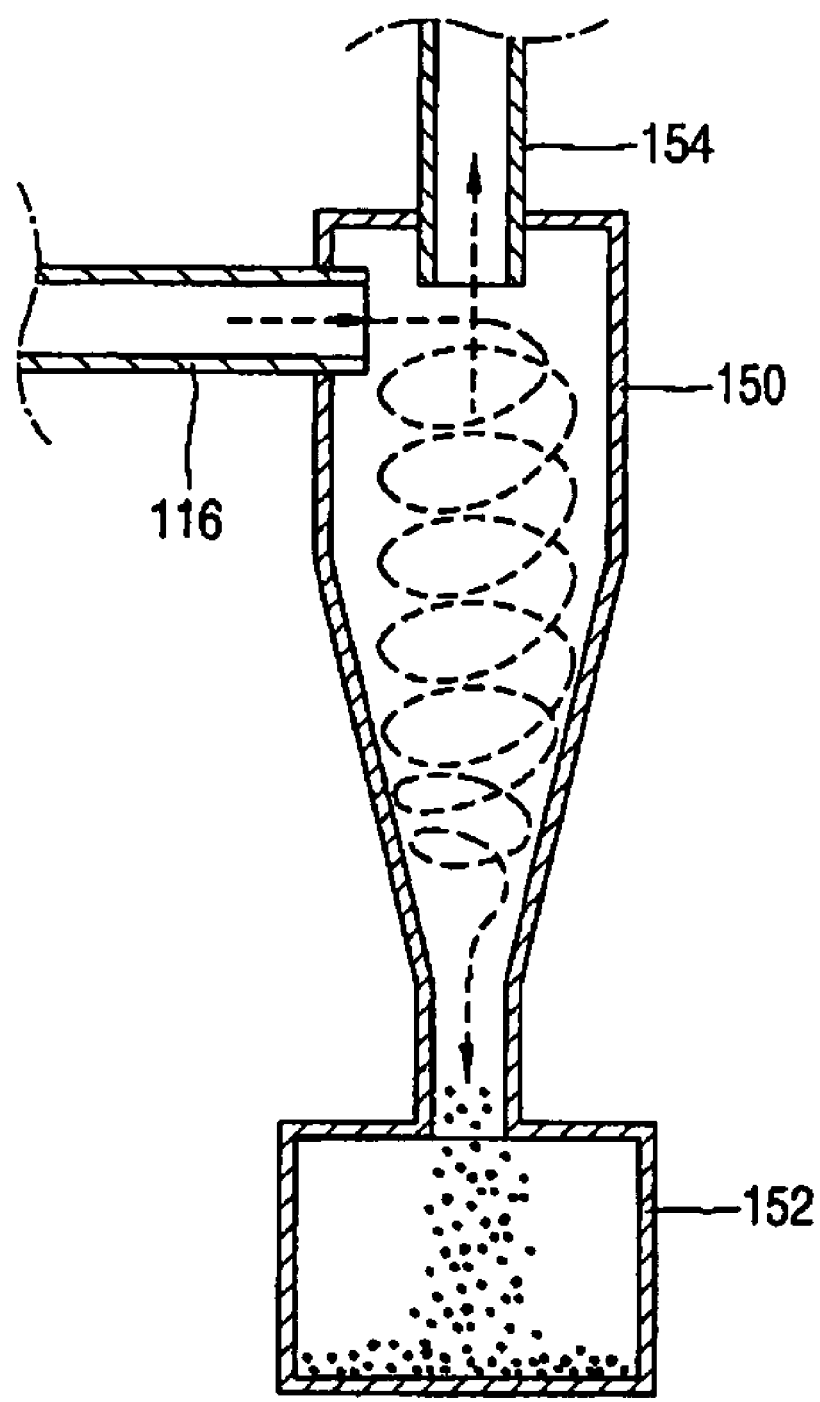
[Fig. 2]

[Fig. 3]
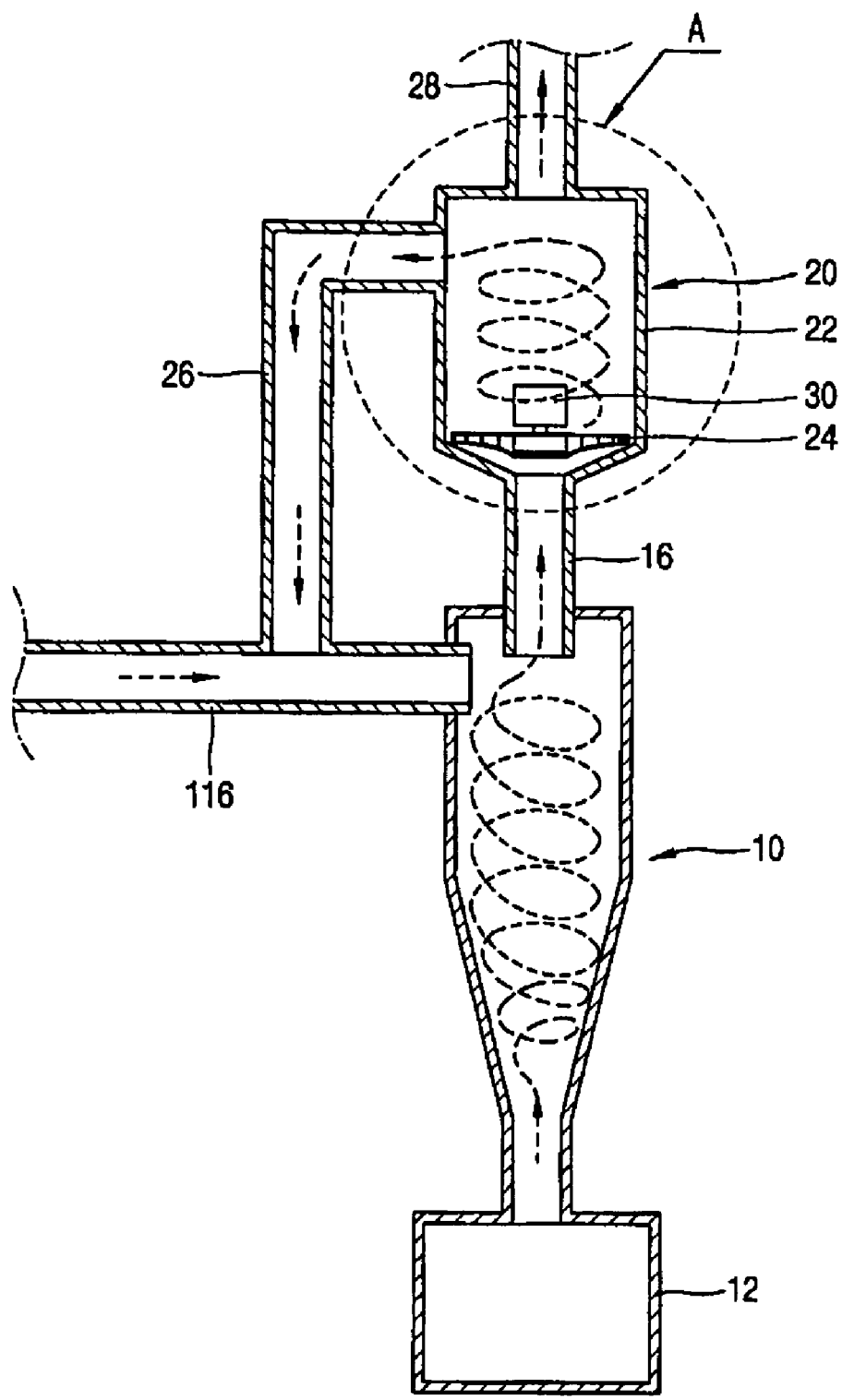

[Fig. 4]
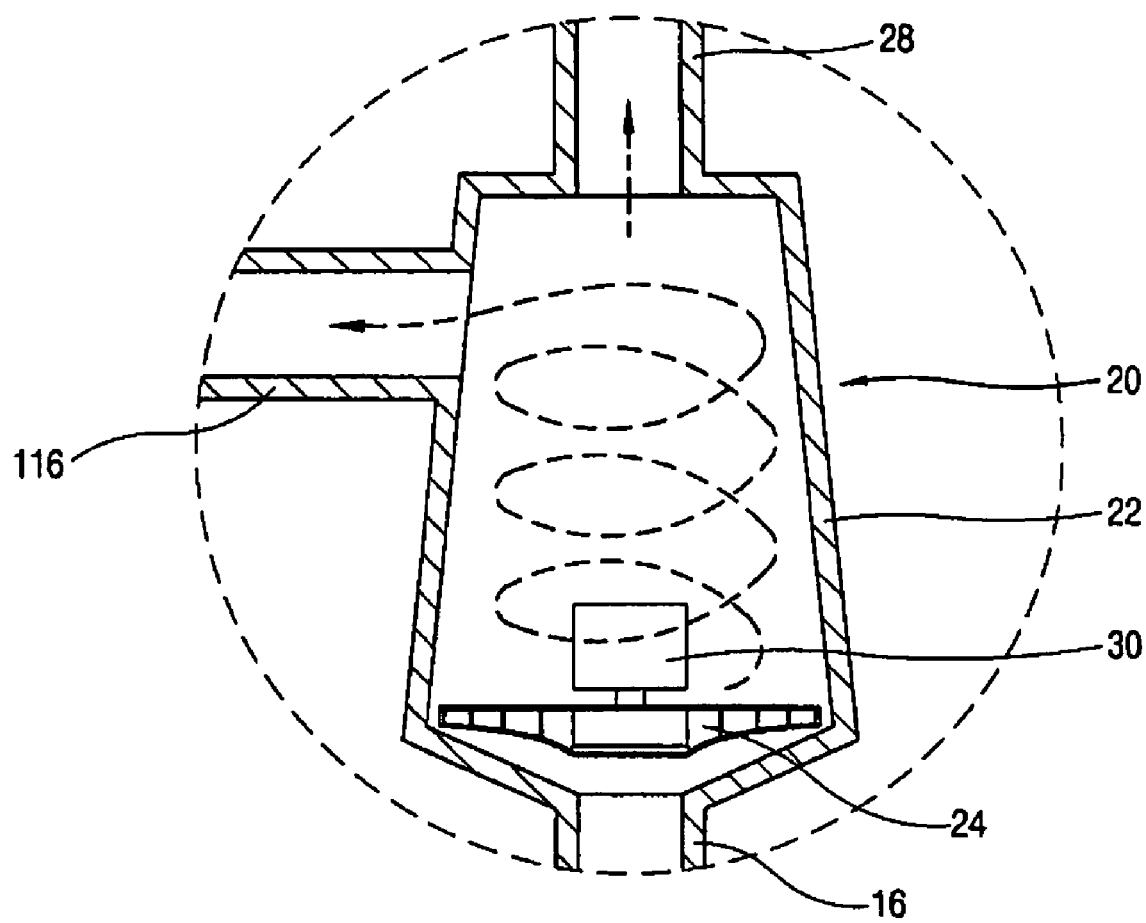

[Fig. 5]
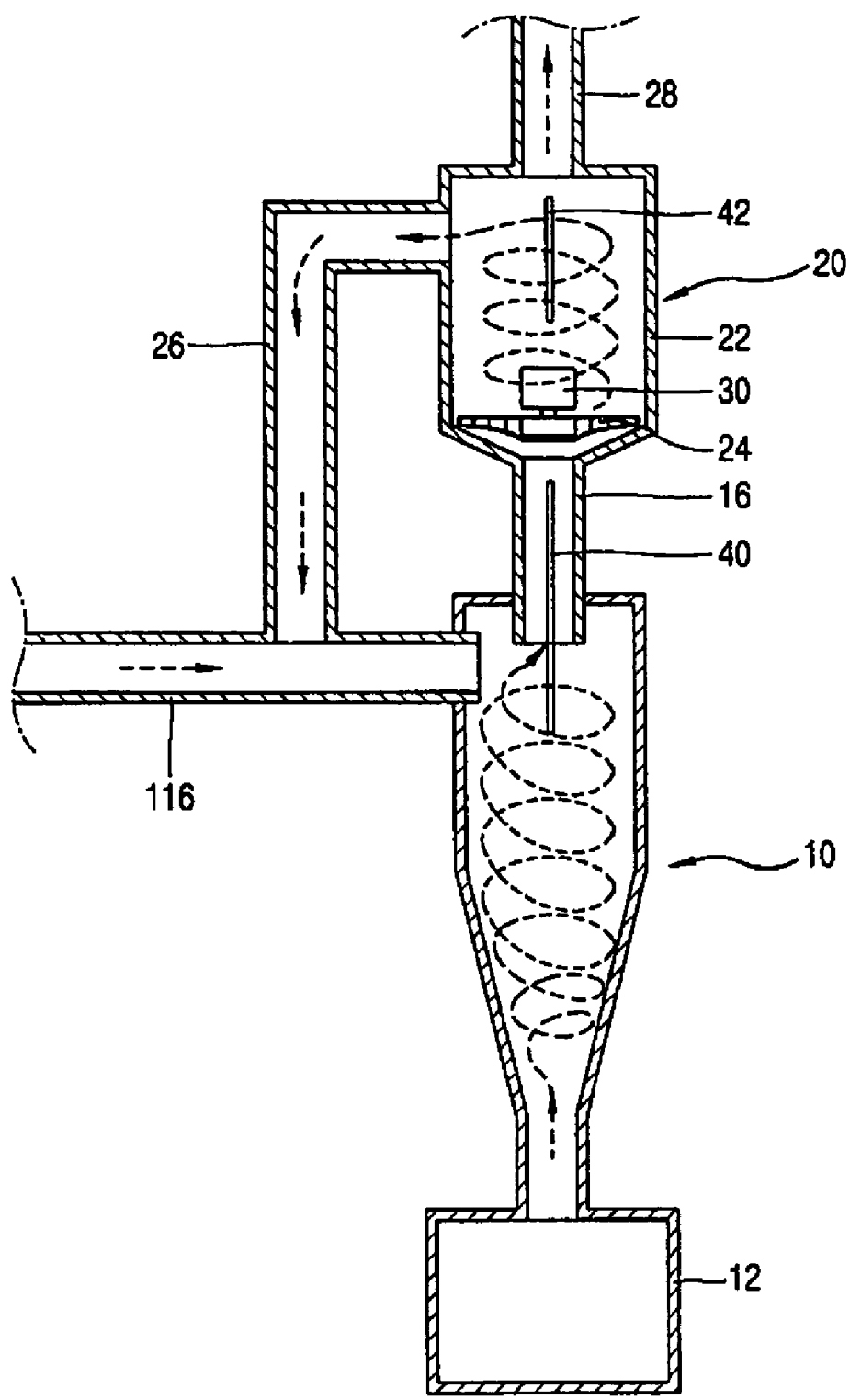

DUST SEPARATOR FOR CYCLONE TYPE CLEANER

TECHNICAL FIELD

The present invention relates to a cyclone type cleaner, and more particularly, to a dust separator of a cyclone type cleaner capable of improving an efficiency of collecting dust in collecting dust while maintaining a high pressure in sucking dust.

BACKGROUND ART

In general, a vacuum cleaner sucks dust or small filth with air and accumulates them in a dust bag. But, such a vacuum cleaner is uneconomical and unsanitary since a dust bag has to be frequently changed and a user has to touch the bag whenever changing it.

Therefore, when accumulating dust or small filth, a cyclone type vacuum cleaner developed to solve such problems accumulates heavy filth first in a dust container made of a transparent material by rotation of sucked air using a centrifugal force. Accordingly, a user can see with the naked eye how much dust or filth are accumulated therein and thus can throw away the dust when a certain amount of dust is accumulated therein. Besides, the dust container is semipermanent. Since the cyclone type vacuum cleaner is economical and sanitary as described, researches therefore are actively ongoing.

FIG. 1 is a sectional view of a general cyclone type vacuum cleaner.

A conventional cyclone type vacuum cleaner includes a cleaner main body 106 to which a dust separator 104 in which dust is collected by a cyclone method is attached, and a suction head 108 mounted at a lower portion of the cleaner main body 106, for sucking dust from a floor.

The cleaner main body 106 is erectly disposed, a knob which a user grabs in order to perform a cleaning operation is mounted at an upper portion of the cleaner main body 106, and a blower 130 driven when power is applied thereto, for generating a suction force for sucking dust is mounted in the cleaner main body 106.

At a lower portion of the suction head 108, there is formed a suction opening 110 into which dust is sucked and a moving wheel 112 for moving the cleaner is mounted. Also, a brush 114 for sweeping up the dust on a floor is rotatably mounted at the suction opening 110.

The suction opening 110 of the suction head 108 is connected to the dust separator 104 by a suction pipe 116 so that the dust sucked through the suction opening 110 is collected in the dust separator 104 through the suction pipe 116.

FIG. 2 is a sectional view of a dust separator in accordance with the conventional art.

A conventional dust separator 104 includes: a hopper 150 connected to the suction pipe 116 and having a certain eddy space, for separating the dust from air; a collecting container 152 in which the dust separated in the hopper 150 is collected; and an air discharge pipe 154 connected to an upper portion of the hopper 152 and through which air separated from the dust is discharged to the outside.

an inner diameter of the hopper 150 becomes narrower toward a lower portion thereof. The suction pipe 116 is eccentrically connected to an upper portion of the hopper 150 in order to generate an whirl in the hopper 150, and the air discharge pipe 154 is inserted in the upper portion of the hopper 150 in certain degree.

Herein, the air discharge pipe 154 is connected to the blower 130 to discharge air.

An operation of the dust separator of the conventional cyclone type vacuum cleaner constructed as above will now be described.

When the blower 130 is driven and thus a suction force is generated, dust on a floor is sucked through the suction opening 110 and then is sucked into the hopper 150 through the suction pipe 116. Air containing the dust sucked into the hopper 150 is rotated in the hopper 150 to thereby separate the dust from air by a centrifugal force. Then, the dust falls in a lower direction and thus is collected in the connecting container 152, and the air separated from the dust is discharged to the outside through the air discharge pipe 154.

However, the cyclone type vacuum cleaner in accordance with the conventional art has following problems.

When the dust and air is separated from each other in the hopper 150 by a centrifugation, fine dust in the air cannot be separated and is included in the air discharged to the outside through the air discharge pipe 154. Accordingly, an efficiency of collecting dust is deteriorated.

In order to solve this problem, if a filter for filtering the dust is installed at the air discharge pipe 154 for discharging air, the efficiency of collecting dust can be improved, but a suction force for sucking dust on a floor is deteriorated by the filter.

DISCLOSURE

Therefore, it is an object of the present invention to provide a dust separator of a cyclone type vacuum cleaner capable of improving efficiency in dust collecting without deteriorating a suction force of air, by separating dust from air by a centrifugal force for the first time and then separating dust from air which has passed through the first dust separation by a centrifugation for the second time.

To achieve the above object, there is provided a cyclone type vacuum cleaner including: a first dust separator connected to a suction pipe, for separating dust from air by a centrifugal force for the first time; a collecting container connected to a lower portion of the first dust separator and in which the dust separated in the first dust separator is collected; and a second dust separator connected to an upper portion of the first dust separator, for sucking air passed the first dust separator and for separating dust from the air by a centrifugal force for the second time.

The first dust separator is formed as a hopper of which an inner diameter becomes narrower toward a lower portion of the hopper and an upper portion of the first dust separator connected to a connection pipe.

The second dust separator includes: a dust separating container connected to the first dust separator by a connection pipe; an impeller rotatably disposed inside the dust separating container, for forcibly rotating the air sucked therein through the connection pipe; and a circulation pipe connected to an upper portion of the dust separating container, for re-sucking the dust separated in the dust separating container into the first separator.

The dust separating container is formed in a cylindrical shape having an whirl generating space, and an side surface of the dust separating container connected to the circulation pipe and an upper portion of the dust separating container connected to an air discharge pipe for discharging filtered air from which the dust is separated.

One side of the circulation pipe is connected to an side surface of the dust separating container and another side thereof is connected to the suction pipe so that the dust separated in the dust separating container is re-sucked into the first dust separator through the suction pipe.

A first electric discharge pole for electrically charging dust in air exhausted from the first dust separator is installed in the connection pipe, and a second electric discharge pole for applying a repulsive force to dust particles which have been electrically charged while passing through the first electric discharge pole to thereby the dust particles toward an inner side wall of the dust separating container.

DESCRIPTION OF DRAWINGS

FIG. 1 is a sectional view of a general cyclone type vacuum cleaner;

FIG. 2 is a sectional view of a dust separator of a cyclone type vacuum cleaner in accordance with the conventional art;

FIG. 3 is a sectional view of a dust separator of a cyclone type vacuum cleaner in accordance with a first embodiment of the present invention;

FIG. 4 is an enlarged view of 'A' part of FIG. 3; and

FIG. 5 is a sectional view of a dust separator of a cyclone type vacuum cleaner in accordance with a second embodiment of the present invention.

MODE FOR INVENTION

Hereinafter, an embodiment of a dust separator of a cyclone type vacuum cleaner in accordance with the present invention will now be described with accompanying drawings.

There may be a plurality of embodiments for a dust separator of a cyclone type vacuum cleaner in accordance with the present invention, but hereinafter the most preferred embodiments therefore will now be described.

FIG. 3 is a sectional view of a dust separator of a cyclone type vacuum cleaner in accordance with the present invention.

In FIG. 1, a cyclone type vacuum cleaner in accordance with the present invention includes a cleaner main body 106 having an upper portion where a knob 102 is mounted and the front where a dust separator 104 is attached; a blower 130 installed at the cleaner main body 106, for generating a suction force for sucking dust; and a suction head 108 mounted at a lower portion of the cleaner main body 106 and having a suction opening 110 through which dust is sucked.

Herein, the dust separator 104 and the suction opening 110 of the suction head 108 are connected by a suction pipe 116 so that the dust sucked into the suction head 108 is supplied to the dust separator 104 through the suction pipe 116.

As shown in FIG. 3, the dust separator in accordance with the present invention includes: a first dust separator 10 connected to the suction pipe 106 and into which the air containing dust is sucked, for separating the dust in the air for the first time by centrifugation; a collecting container 12 connected to the lower portion of the first dust separator 10 and in which the dust separated in the first dust separator 10 is collected; and a second dust separator 20 connected to an upper portion of the first dust separator 10, for separating the dust from air which has passed through the first separation in the first dust separator 10 for the second time.

The first dust separator 10 is formed as a hopper of which an inner diameter becomes narrower a lower portion of the hopper. The suction pipe 116 is eccentrically connected to an outer side surface of the first dust separator 10 so as to generate an whirl, the collecting container 12 is separably mounted to the lower portion of the first dust separator 10, and a connection pipe 16 connected to the second dust separator 20 is connected to the upper end of the first dust separator 10.

The collecting container 12 is made of a transparent material so that a user can check with the naked eye how much the dust is collected therein. When a certain amount of dust is accumulated therein, a user separates the collecting container 12 from the first dust separator 10 and remounts it to the first dust separator 10. Accordingly, the collecting container 12 can be used semipermanently.

As shown in FIG. 4, the second dust separator 20 includes: a dust separating container 22 connected to the first dust separator 10 by a connection pipe 16 and into which the dust separated in the first dust separator 10 for the first time is sucked; an impeller 24 rotatably mounted inside the dust separating container 22, for separating the dust for the second time by forcibly rotating the air sucked into the dust separating container 22; and a circulation pipe 26 connected to an outer side surface of the dust separating container 22, for reintroducing the dust separated in the dust separating container 22 to the first dust separator 10.

The dust separating container 22 is formed in a cylindrical shape having an eddy generating space and has a lower portion connected to the connection pipe 16, an outer side of dust separating container 22 the connected to the circulation pipe 26 and an upper portion connected to an air discharge pipe 28 through which clean air which has passed through the second dust separation in the dust separating container 22 is discharged to the outside Herein, the air discharge pipe 28 is connected to the blower 130 to discharge air.

The impeller 24 is rotatably disposed on the bottom of the dust-separating container 22 and is connected to the driving motor 30. When the driving motor 30 is driven, the impeller 24 is rotated, thereby forcibly rotating the air sucked therein through the connection pipe 16. Accordingly dust in the air is pushed outside the dust separating container 22 and thus is separated from the air.

One side of the circulation pipe 26 is connected to the upper side surface of the dust separating container 22, and another side thereof is connected to the suction pipe 116, so that the dust separated in the dust separating container 22 is re-sucked into the first dust separator 10 through the suction pipe 116.

An operation of the dust separator of the cyclone type vacuum cleaner in accordance with the present invention constructed as above will now be described.

When the blower 130 is driven and thus a suction force is generated, dust on a floor is sucked through the suction opening 110 and then is sucked into the first dust separator through the suction pipe 116. Air containing the dust sucked into the first dust separator is rotated in the first dust separator, to thereby separate the dust from air by a centrifugal force for the first time. The separated dust falls downwardly and is collected in the collecting container 12, and the air separated from the dust for the first time is sucked into the dust separating container through the connection pipe 16.

The air sucked to the dust separating container is forcibly rotated by rotation of an impeller mounted inside the dust separating container, and thus the dust in the air is forcibly pushed outside the dust separating container, being separated from the air for the second time. The dust separated for the second time is introduced into a suction pipe through the circulation pipe and is re-sucked into the first dust separator.

The clean air which has passed through the second dust separation in the dust separating container is discharged to the outside through the air discharge pipe.

FIG. 5 is a sectional view of a dust separator in accordance with the second embodiment of the present invention.

The dust separator in accordance with the second embodiment has the same structure as the first embodiment, except electric discharge poles installed in a connection pipe and a dust separating container in order to strengthen a force for pushing dust from the inside of the dust separating container to the outside.

That is, the dust separator in accordance with the second embodiment of the present invention includes a first electric discharge pole 40 installed inside the connection pipe 16, for electrically charging the dust in the air passing through the connection pipe 16; and a second electric discharge pole 42 installed at the center inside the dust separating container 22, for applying a repulsive force to dust particles electrically charged passing through the first electric discharge pole 40 and thus moving the dust particles toward the inner side wall.

An operation of the dust separator in accordance with the second embodiment will now be described. When the air which has passed through the dust separation in the first dust separator 10 for the first time is introduced to the connection pipe 16, the first electric discharge pole 40 installed inside the connection pipe 16 electrically charges fine dust in the air passing through the connection pipe 16.

Then, dust particles electrically charged passing through the connection pipe 16 is sucked into the dust separating container 22. Then, the second electric discharge pole 42 installed at the center of the dust separating container 16 applies an electric force to the electrically charged dust particles, so that the dust particles are pushed toward the inner side wall of the dust separating container 22. The dust pushed toward the inner side wall of the dust separating container 22 is exhausted to the circulation pipe 26 connected to the side surface of the dust separating container 22.

As so far described, in the dust separator in accordance with the second embodiment, the first electric discharge pole 40 and the second electric discharge pole 42 are respectively installed in the connection pipe 16 and the dust separating container 22, so that a dust particle introduced into the dust separating container 22 through the connection pipe 16 is pushed toward an inner side wall of the dust separating container 22. Accordingly, its dust separating performance is improved.

In a dust separator of a cyclone type cleaner in accordance with the present invention constructed and operated as above, dust is separated from the air in a first dust separator for the first time and then is separated again from the air in a second dust separator for the second time, so that dust collecting performance can be improved. Besides, in such a cyclone type cleaner, since a separate filter or the like is unnecessary, a suction force can be prevented from being deteriorated.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A dust separator of a cyclone type cleaner comprising:
a first dust separator connected to a suction pipe, for separating dust from air by a centrifugal force for the first time;
a collecting container connected to a lower portion of the first dust separator and in which the dust separated in the first dust separator is collected; and
a second dust separator connected to an upper portion of the first dust separator, for sucking air passed through the first dust separator and for separating dust from the air by a centrifugal force for the second time,
wherein the second dust separator comprises:
a dust separating container connected to the first dust separator by a connection pipe; and
a circulation pipe connected to the dust separating container, for re-sucking the dust separated in the dust separating container into the first dust separator.

2. The dust separator of claim 1, wherein the first dust separator is formed as a hopper of which an inner diameter become narrower toward a lower portion of the hopper and an upper portion of the first duct separator is connected to the connection pipe.

3. The dust separator of claim 1, wherein the second dust separator further comprises:
an impeller rotatably disposed inside the dust separating container, for forcibly rotating the air sucked therein through the connection pipe.

4. The dust separator of claim 1, wherein the dust separating container is formed in a cylindrical shape having an whirl generating space, and the outer side of the dust separating container is connected to the circulation pipe and the upper portion of the dust separating container is connected to an air discharge pipe for discharging filtered air from which the dust is separated.

5. The dust separator of claim 3, wherein the impeller is connected to a driving motor for being rotated by the driving motor.

6. The dust separator of claim 1, wherein one side of the circulation pipe is connected to the outer side of the dust separating container and another side thereof is connected to the suction pipe so that the dust separated in the dust separating container is re-sucked into the first dust separator through the suction pipe.

7. The dust separator of claim 3, wherein a first electric discharge pole for electrically charging dust in air exhausted from the first dust separator is installed in the 8. A cyclone type cleaner comprising:
a cleaner main body having a blower generating a suction force for sucking dust;
a suction head mounted at the cleaner main body and having a suction opening through which dust is sucked; and
a dust separator connected to a suction pipe which is connected to the suction head, wherein the dust separator comprises:
a first dust separator connected to a suction pipe, for separating dust from air by a centrifugal force for the first time;
a collecting container connected to a lower portion of the first dust separator and in which the dust separated in the first dust separator is collected; and
a second dust separator connected to an upper portion of the first dust separator, for sucking air passed though the first dust separator and for separating dust from the air by a centriftigal force for the second time,
wherein the second dust separator comprises:
a dust separating container connected to the first dust separator by a connection pipe; and
a circulation pipe connected to the dust separating container, for re-sucking the dust separated in the dust separating container into the first dust separator.

* * * * *